(12) United States Patent
Yoshida (10) Patent No.: US 7,613,359 B2
(45) Date of Patent: Nov. 3, 2009

(54) SINGLE-CHIP COLOR CAMERA FOR HIGH ACCURACY IMAGE MEASUREMENTS

(75) Inventor: Hiroyuki Yoshida, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 683 days.

(21) Appl. No.: 11/335,507

(22) Filed: Jan. 20, 2006

(65) Prior Publication Data
US 2007/0036465 A1    Feb. 15, 2007

(30) Foreign Application Priority Data
Jan. 26, 2005    (JP) .............................. 2005-018380

(51) Int. Cl.
*G06K 9/36*    (2006.01)
*G06K 9/40*    (2006.01)
(52) U.S. Cl. ..................... 382/276; 382/275; 382/254
(58) Field of Classification Search ............... 348/279, 348/607; 382/162, 254, 275, 276
See application file for complete search history.

(56) References Cited

U.S. PATENT DOCUMENTS

| 5,471,535 A | 11/1995 | Ikezawa et al. | |
|---|---|---|---|
| 6,229,578 B1 * | 5/2001 | Acharya et al. | 348/607 |
| 6,978,050 B2 * | 12/2005 | Hunter et al. | 382/275 |
| 2003/0160881 A1 * | 8/2003 | Roddy et al. | 348/272 |
| 2004/0169749 A1 * | 9/2004 | Acharya | 348/279 |

FOREIGN PATENT DOCUMENTS

| EP | 0 532 823 A2 | 3/1993 |
|---|---|---|
| EP | 1 339 238 A2 | 8/2003 |
| JP | A 10-145612 | 5/1998 |
| JP | A 2000-205843 | 7/2000 |
| TW | 455781 | 9/2001 |

* cited by examiner

*Primary Examiner*—Wenpeng Chen
*Assistant Examiner*—Nirav G Patel
(74) *Attorney, Agent, or Firm*—Oliff & Berridge, PLC (57) ABSTRACT

An image measuring apparatus comprises an imaging portion with pixels, each pixel being allocated with one color, four pixels constituting one set, one set being allocated with a plurality of colors to express a color, and the sets being arranged in matrix, configured to image a measuring object and output four image data based on the four pixels, respectively; and a calculation portion which calculates, based on the four image data, respectively, positions of the measuring object and contrast values at one side and an other side across the measuring object as a boundary, and which generates a position data of the measuring object based on the positions and contrast values, and outputs the position data.

11 Claims, 14 Drawing Sheets

SINGLE-CHIP COLOR CAMERA FOR HIGH ACCURACY IMAGE MEASUREMENTS

CROSS REFERENCE TO RELATED APPLICATIONS

This application is based on and claims the benefit of priority from prior Japanese Patent Application No. 2005-18380 filed on Jan. 26, 2005, the entire contents of which are incorporated herein by reference.

BACKGROUND OF THE INVENTION

1. Field of the Invention

The present invention relates to, for example, an image measuring apparatus and an image measuring method using a single-chip color camera.

2. Description of the Related Art

The image measuring apparatus is a precise measuring instrument which images a work, detects the edge position of the work on the image, and measures the shape and dimension and the like of the work based on the edge position. A CCD (Charge Coupled Device) color camera including the CCD as the image sensor is commonly used for imaging (see, for example, Japanese application patent laid-open publication No. Hei 10-145612 (paragraph 0057, FIG. 4)).

Because the CCD senses only light intensity, the CCD alone can provide only monochrome images. A color filter over each pixel of the CCD can provide color images. For example, for color expression with R (red), G (green), and B (blue), filters of these three colors are necessary.

Information (sensitivity) of all RGB colors is necessary for one pixel to provide color image. Because only one type of color filter can reside over one pixel (that is, only one color can be allocated to one pixel), one pixel can provide only one type of color information. To provide color images in such a limitation, a three-chip (i.e. three-CCD type or three-CMOS sensor type) color camera and a single-chip (i.e. one-CCD type or one CMOS-sensor type) color camera have been developed.

The three-chip color camera has three CCDs with the same resolution. An RGB spectral prism divides incoming light into R, G, and B components. An R-band CCD senses the R component, a G-band CCD the G component, and a B-band CCD the B component. The single-chip color camera has one CCD with each pixel having thereover either one of the R, G, and B color filters. A postprocess provides pseudo-colorization by calculating the information of the absent color of R, G, and B for each pixel using the color information obtained from the adjacent pixel.

At edges of the work, however, the brightness extremely differs between adjacent pixels. In the single-chip color camera which uses the color information from the adjacent pixels to express color, therefore, the abnormal color-density change at the edge may blur the edge image or may cause a zigzag pattern. An edge position detection based on such an image will increase the measurement error, prohibiting high accuracy measurements. The current image measuring apparatus thus uses the three-chip color camera which provides high-precision images.

The three-chip color camera, however, suffers from the following drawbacks. (1) The three-chip color camera is more expensive than the single-chip color camera because it needs three CCDs, which contributes to the cost of the image measuring apparatus. (2) The image measuring apparatus includes the CCD, color camera in a movable unit. For higher positioning accuracy of the unit, the unit needs to be driven with as little force as possible. Because the three-chip color camera includes three CCDs, a CCD with the same light-receiving size as the CCD in the B/W (black and white) camera will increase the camera size. This, in turn, provides a larger unit which needs to be driven by more force. (3) During the assembly of the RGB spectral prism which is one of the manufacturing processes of the CCD color camera, dust can easily be trapped on the mating faces of the prism. The image measuring apparatus has a microscope optical system which uses a narrow incoming beam. If, therefore, the RGB spectral prism with the dust trapped splits the incoming light beam, the dust may be imaged together with the work. It is thus unpractical for the image measuring apparatus to use the three-chip color camera with the dust trapped on the mating faces of the prism. The three-chip color camera thus has a lower yield than the single-chip color camera, which also contributes to the cost of the image measuring apparatus.

It is an object of the present invention to provide an image measuring apparatus and an image measuring method which allows high accuracy measurements using the single-chip color camera as the imaging portion.

SUMMARY OF THE INVENTION

An image measuring apparatus according to the present invention comprises: an imaging portion with pixels, each pixel being allocated with one color, four pixels constituting one set, one set being allocated with a plurality of colors to express a color, and said sets being arranged in matrix, configured to image a measuring object and output four image data based on said four pixels respectively; and a calculation portion which calculates, based on the four image data respectively, positions of the measuring object and contrast values at one side and an other side across the measuring object as a boundary, and which generates a position data of the measuring object based on the positions and contrast values, and outputs the position data.

The image measuring apparatus according to the present invention calculates positions of the measuring object and contrast values, respectively for the four image data before pseudo-colorization. This calculation is thus not affected by the abnormal color-density change due to the extreme brightness difference among the adjacent pixels. The present invention generates a position data of the measuring object based on the these positions and contrast values and outputs the position data of the measuring object (for example, calculates the average value of the position of the measuring object by weighing the constant values and by outputs it as the position data of the measuring object). The present invention can thus provide high accuracy measurements using the single-chip color camera as the imaging portion.

The image measuring apparatus according to the present invention can further comprise: a single-chip color camera comprising the imaging portion; and a personal computer comprising a pseudo-colorization processing portion which processes pseudo-colorization with the four image data from the imaging portion, and the calculation portion.

The system according to the present invention is the image measuring apparatus in which the single-chip color camera obtains the four image data and outputs the data without pseudo-colorizing them therein, and in which the data are then pseudo-colorized by the personal computer. With this arrangement, the personal computer also calculates of the position data of the measuring object, so that it is possible to use an existing single-chip color camera in which the camera does not internally perform pseudo-colorization.

In the image measuring apparatus according to the present invention, different colors may be allocated to the four pixels. This can provide an image data based on four types of colors. Thus, even though an error in the measuring object position based on a one-color image data is large, an error can be smaller, because the measuring object positions based on the remaining three-color image data are also used in the average calculation.

An image measuring method according to the present invention comprises the steps of: imaging a measuring object using an imaging portion with pixels, each pixel being allocated with one color, four pixels constituting one set, one set being allocated with a plurality of colors to express a color, and said sets being arranged in matrix, to output four image data based on said four pixels respectively; calculating, based on the four image data respectively, positions of the measuring object and contrast values at one side and an other side across the measuring object as a boundary; and generating a position data of the measuring object based on the positions and contrast values, and outputting the position data.

The image measuring apparatus and image measuring method according to the present invention calculates positions and contrast values of the measuring object, respectively for four image data based on the colors allocated to the four pixels, and generates and outputs the position data of the measuring object based on them. The present invention can thus provide an image measuring apparatus and an image measuring method which allows high accuracy measurements using the single-chip color camera as the imaging portion.

DETAILED DESCRIPTION OF THE EMBODIMENTS

Figure 1:
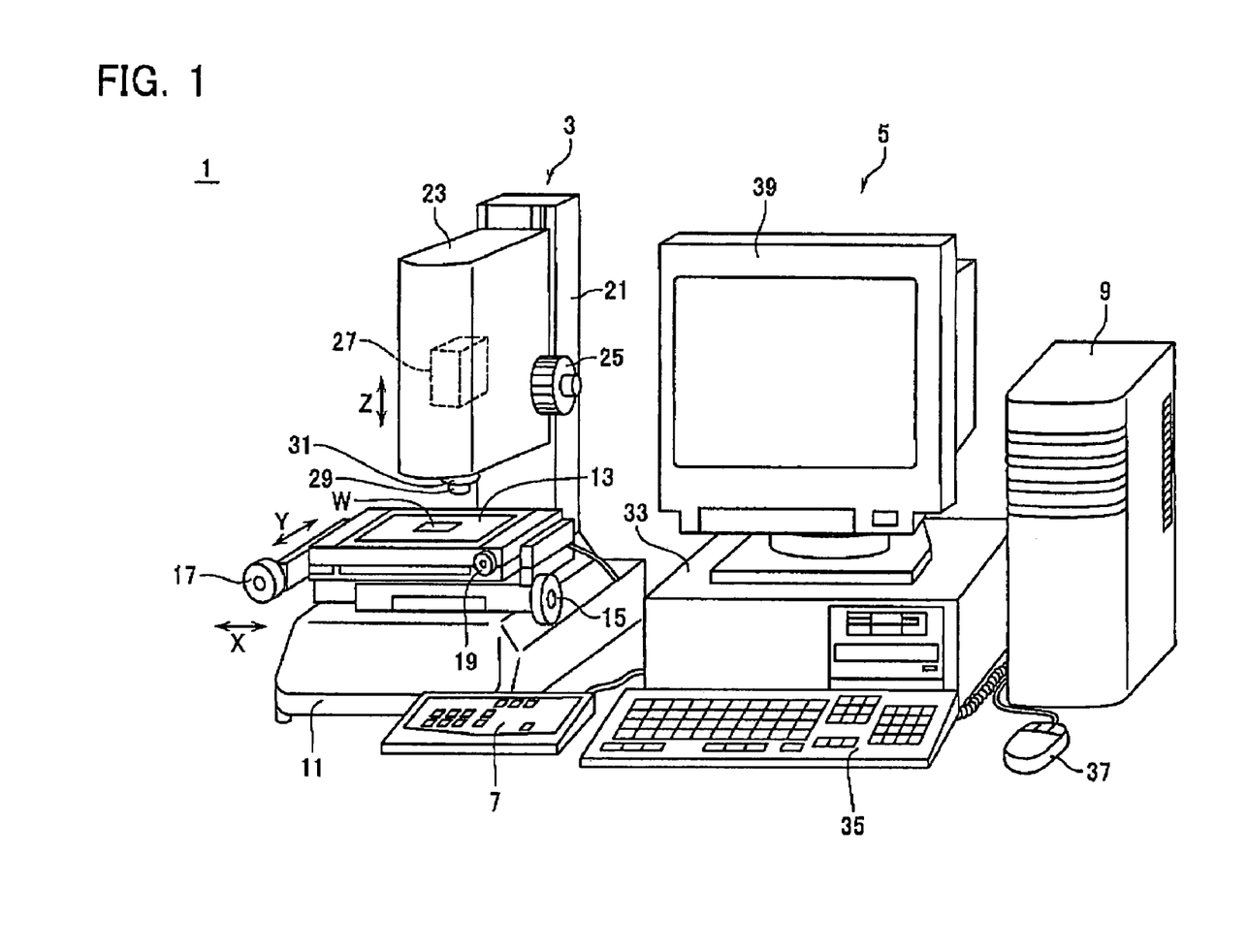
FIG. 1 is a perspective view of the entire configuration of the image measuring apparatus according to this embodiment.

FIG. 1 shows a perspective view of the entire configuration of the image measuring apparatus 1 of a manual operation type according to this embodiment. The device 1 comprises a measurement device body 3 of a noncontact image-measurement type, a personal computer 5 which performs necessary measurement processes, an instruction input portion 7 which provides necessary measurement instructions to the measurement device body 3, and a power supply unit 9 which provides a stable power to the measurement device body 3. Note that the measurement device body 3 may contain the power supply unit 9.

The measurement device body 3 has the following configuration. The base 11 bears a stage 13 on which a work W is mounted. The stage 13 can move in X-axis direction and Y-axis direction by manual operation of an X-axis control 15, a Y-axis control 17, and a fine control 19.

The frame 21 supports a camera unit 23. A Z-axis control 25 can move the camera unit 23 in Z-axis direction along a guide rail formed on the frame 21. The camera unit 23 contains a single-chip color camera 27 which views the stage 13 from above. The camera 27 has its image head 29 exposed outside. The camera 27 images the work W mounted on the stage 13. The image head 29 has a lens around which is provided a ring-shaped oblique-illumination device 31 for emitting illumination light on the work W.

The personal computer 5 comprises a computer body 33, a keyboard 35, a mouse 37, and a CRT 39.

Figure 2:
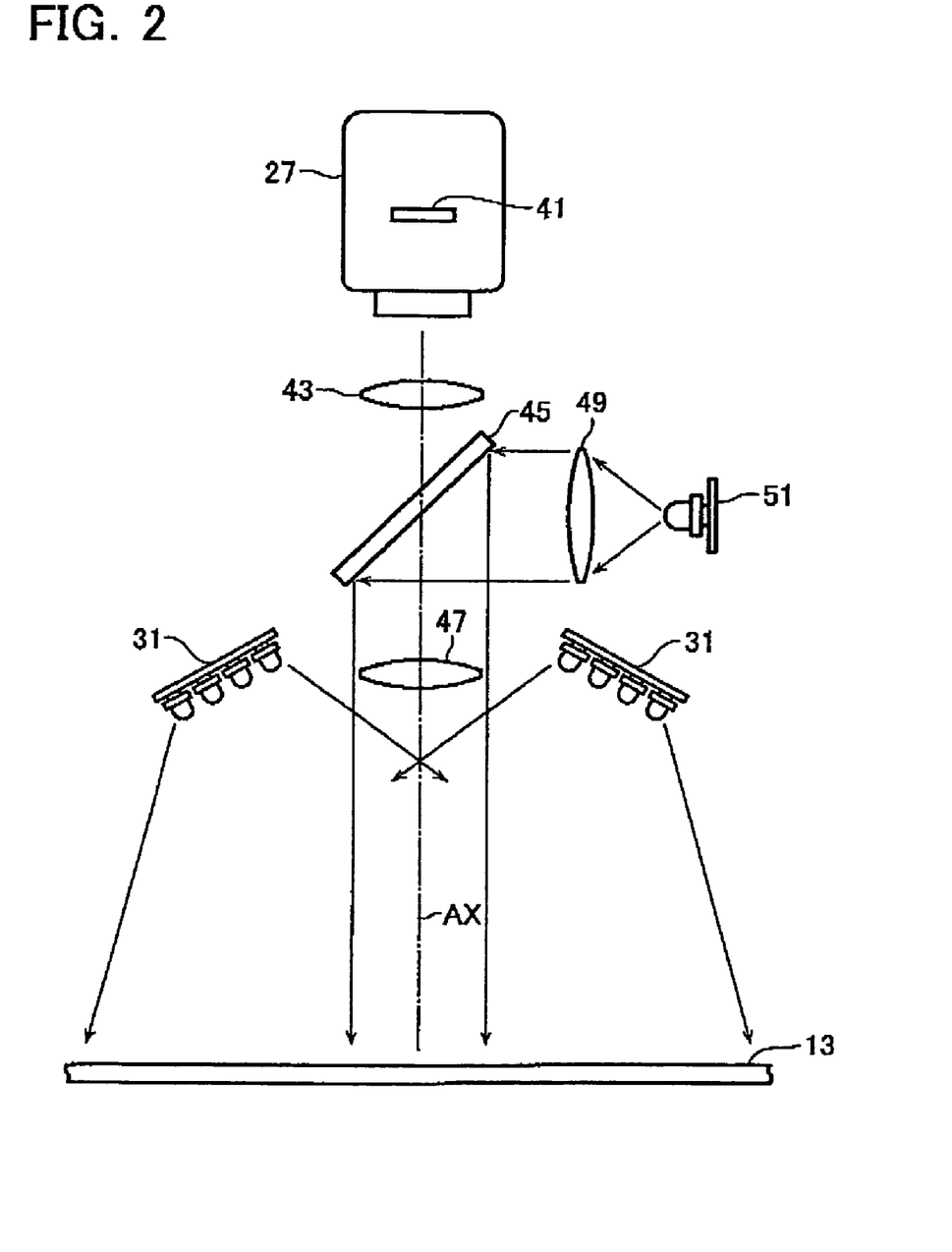
FIG. 2 shows the optical system of the measurement device body included in the image measuring apparatus in FIG. 1.

A description is now given of the optical system of the measurement device body 3. FIG. 2 shows the optical system of the measurement device body 3. The single-chip color camera 27 includes as a CCD 41 as an example of an imaging portion. The single-chip color camera 27 is opposed to the stage 13. An imaging lens 43, a half mirror 45, and an objective lens 47 reside on the light axis AX of the single-chip color camera 27. The imaging lens 43 and half mirror 45 reside in the camera unit 23 in FIG. 1. The objective lens 47 fastens on the image head 29.

The oblique-illumination device 31 resides around the objective lens 47. The device 31 directly illuminates the stage 13. In the rear of the half mirror 45 in the camera unit 23, an incident-light illumination device 51 resides via a collimator lens 49. The device 51 illuminates the stage 13 via the half mirror 45.

Figure 3:
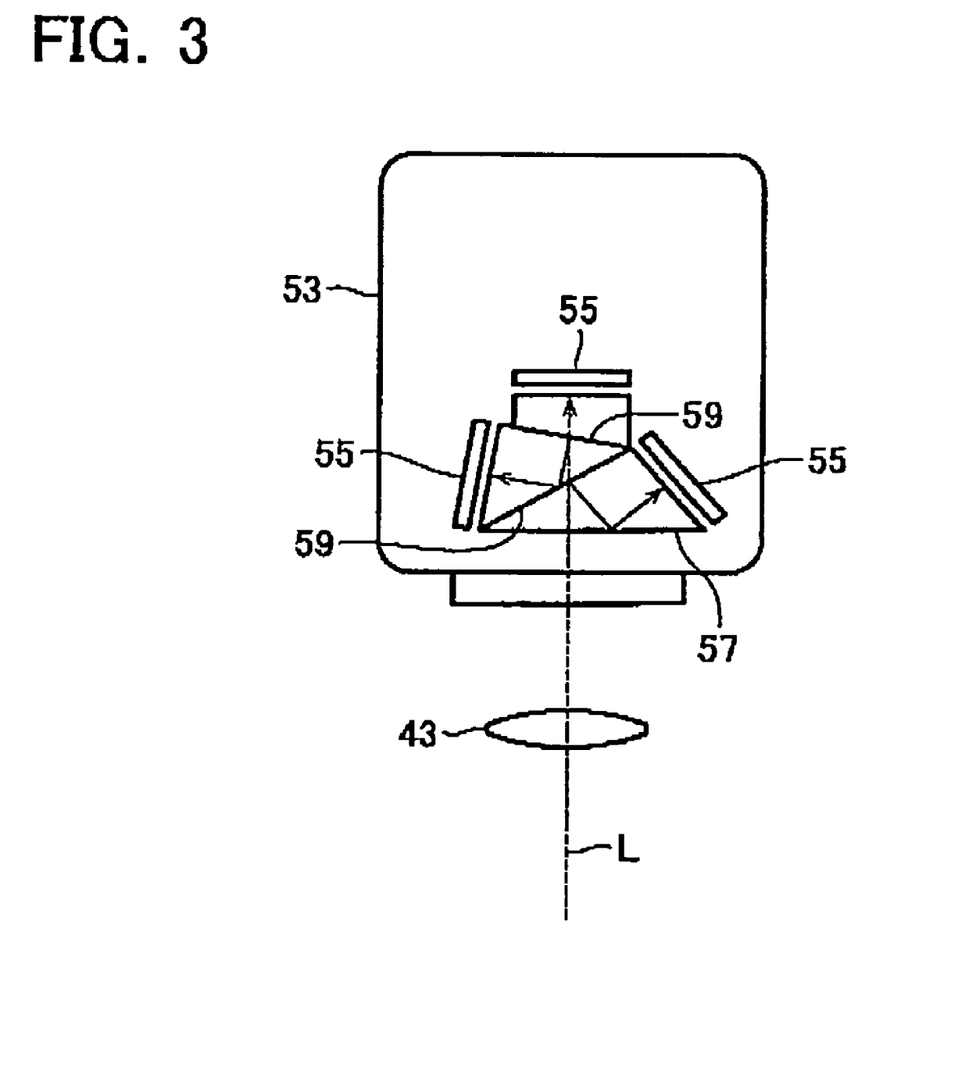
FIG. 3 shows an internal structure of the three-chip color camera.

By way of comparison with the single-chip color camera 27, the three-chip color camera is described below. FIG. 3 shows the internal structure of the three-chip color camera 53. The camera 53 has three CCDs 55, and a spectral prism 57 in front of them. After passing through the imaging lens 43, the light L is splitted by the spectral prism 57 into RGB components which are received by the corresponding CCDs 55. During the assembly of the spectral prism 57 which is one of the manufacturing processes of the three-chip color camera 53, dust can easily be trapped on the mating faces 59 of the spectral prism 57.

Figure 4:
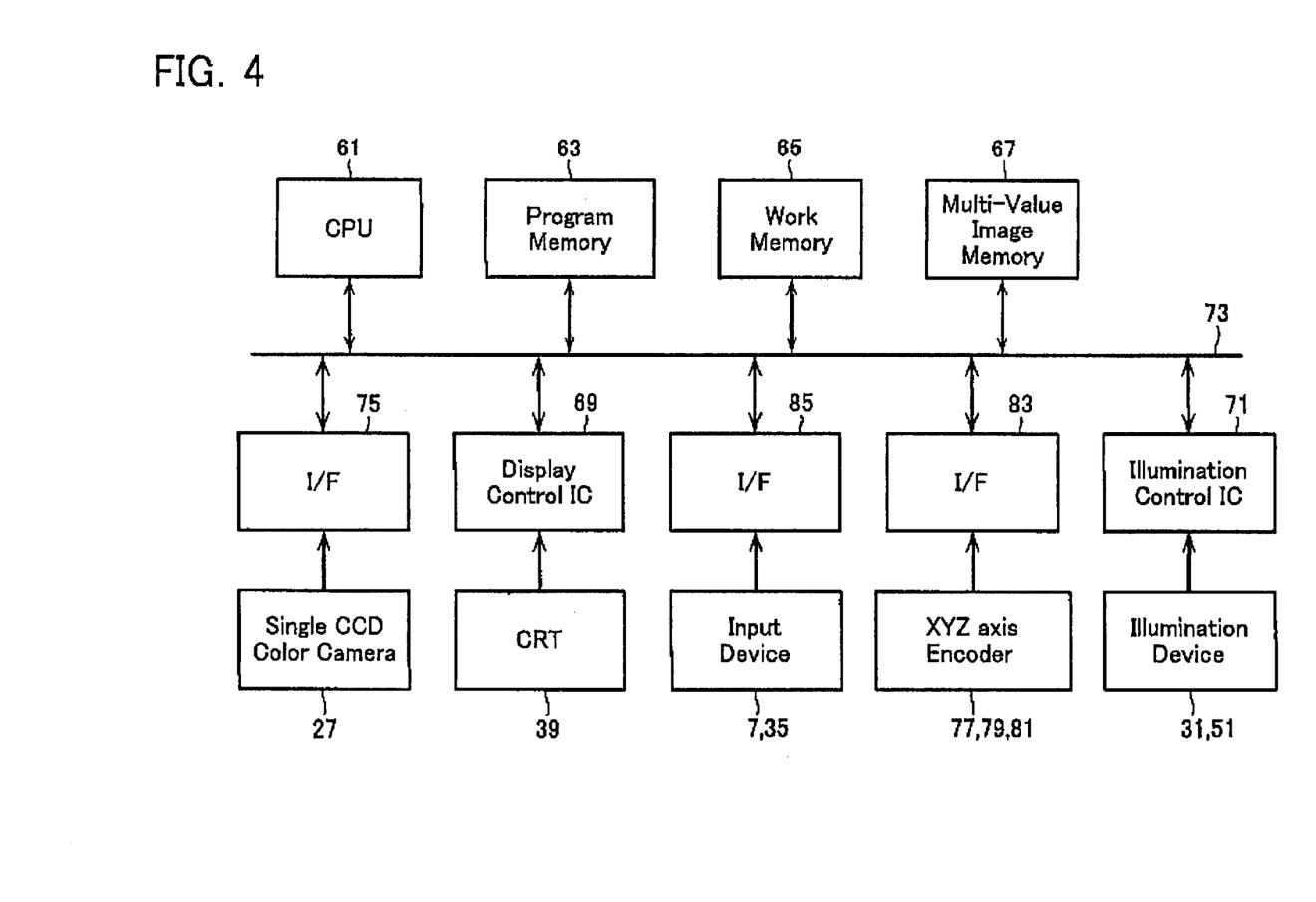
FIG. 4 shows a hardware configuration which can implement this embodiment.

FIG. 4 shows a hardware configuration which can implement this embodiment. Connected to a bus 73 are CPU 61, a program memory 63, a work memory 65, a multi-value image memory 67, a display control IC 69, and an illumination control IC 71. A CRT 39 connects to the display control IC 69. The oblique-illumination device 31 and incident-light illumination device 51 connect to the illumination control IC 71.

The single-chip color camera 27 connects to the bus 73 via an interface 75. The single-chip color camera 27 takes an image data of the work W. The CPU 61 processes the image data. The multi-value image memory 67 then stores the processed data. The display control IC 69 converts the data stored in the multi-value image memory 67 into the image of the work W. The CRT 39 then displays the image of the work W. The CPU 61 measures the shape, dimension, and the like of the work W. The work memory 65 provides work areas for various processes by the CPU 61.

An X-axis encoder 77, a Y-axis encoder 79, and a Z-axis encoder 81 reside to detect the positions of the single-chip color camera 27 in the X-, Y-, Z-axis directions, respectively, relative to the stage 13. These encoders connect to the bus 73 via an interface 83. The CPU 61 thus incorporates the outputs from the encoders 77, 79, and 81. The CPU 61 calculates the current position of the work, or the like, according to the information on each axis position or the like which the CPU 61 incorporates.

The illumination control IC 71 generates an analog instruction voltage based on the instruction value generated by the CPU 61. The illumination control IC 71 then applies the instruction voltage to the oblique-illumination device 31 and incident-light illumination device 51. The input device (instruction input portion 7 and keyboard 35) connects to the bus 73 via an interface 85.

Figure 5:
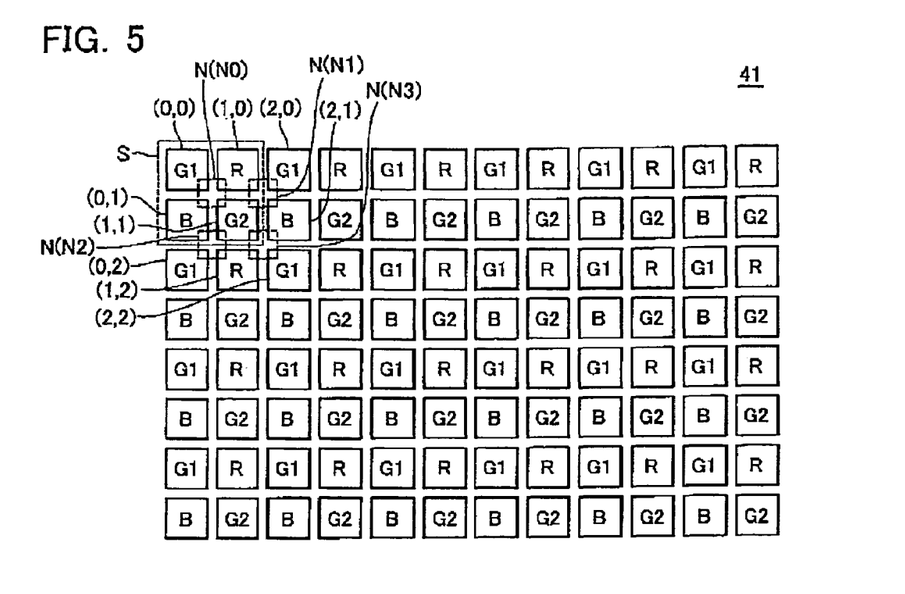
FIG. 5 is a plan view of the CCDs in the single-chip color camera provided in the image measuring apparatus in FIG. 1.

A description is now given of the CCD 41 included in the single-chip color camera 27 in FIG. 2. FIG. 5 is a plan view of the CCD 41. The CCD 41 is an example of the imaging portion. The CCD 41 comprises a number of pixels (0,0), (1,0), . . . , (m,n) arranged in a matrix of m×n elements. FIG. 5 shows a portion of the pixels. Each pixel has thereover any one of the filter R, filters G1 and G2, and filter B.

A pixel with the filter R provides information on the R component. A pixel with the filter G1 or G2 provides information on the G component. A pixel with the filter B provides information on the B component. The number of pixels for the G component is twice the number of pixels for the R component or B component, because the human optic nerve is most sensitive to the G component.

The arrangement of the filters is described in more detail below. The CCD 41 comprises two alternating rows: one comprises alternately the pixel with the filter G1 and the pixel with the filter R, and another comprises alternately the pixel with the filter B and the pixel with the filter G2. This is the so-called Bayer arrangement. This arrangement comprises a plurality of sets S arranged in a matrix. Each set S comprises the pixel with the filter G1, the pixel with the filter R, the pixel with the filter B, and the pixel with the filter G2.

As described above, the configuration of the CCD 41 as an imaging portion can be expressed as follows: each pixel is allocated with one color; four pixels constitute one set; one set is allocated with a plurality of colors to express a color; and the sets are arranged in matrix.

Each pixel provides only one color information. The single-chip color camera performs pseudo-colorization by obtaining the absent color information of each pixel from the color information of the adjacent pixels. The adjacent pixels form an adjacent-pixel group N. The adjacent-pixel group N may be defined in different manners. This embodiment defines the group N as follows. The adjacent-pixel group N0 comprises the pixels (0,0), (1,0), (0,1), and (1,1). The adjacent-pixel group N1 comprises the pixels (1,0), (2,0), (1,1), and (2,1). The adjacent-pixel group N2 comprises the pixels (0,1), (1,1), (0,2), and (1,2). The adjacent-pixel group N3 comprises the pixels (1,1), (2,1), (1,2), and (2,2). Likewise, other adjacent-pixel groups each comprise adjacent four pixels with different filters.

Figure 6:
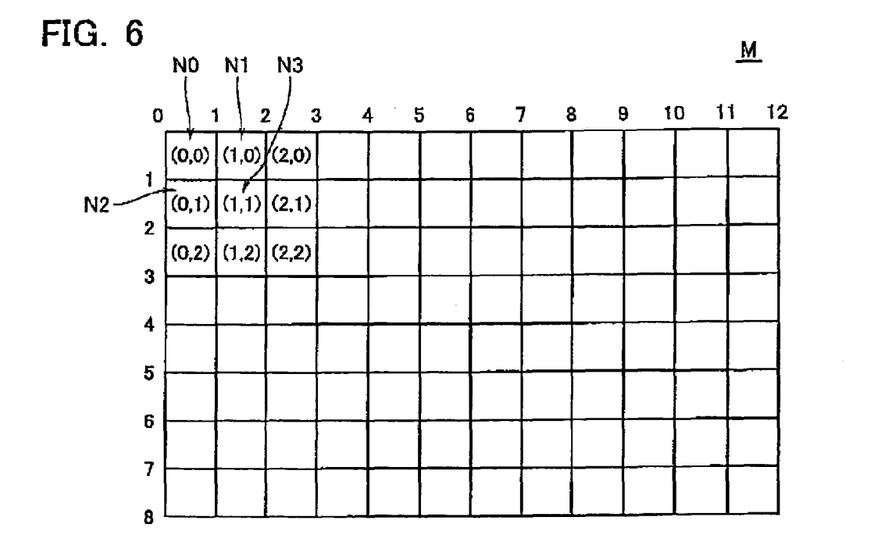
FIG. 6 shows a memory area for storing the image data including the pseudo-colorized color information.

The multi-value image memory 67 shown in FIG. 4 stores the image data comprising pseudo-colorized color information. More specifically, the memory area M of the multi-value image memory 67 shown in FIG. 6 stores the image data. The color information on the pseudo colors of the pixels shown in FIG. 5, for example, is calculated as follows. The color information on the pseudo color of the pixel (0,0) is calculated from the color information of the adjacent-pixel group N0. The color information on the pseudo color of the pixel (1,0) is calculated from the color information of the adjacent-pixel group N1. The color information on the pseudo color of the pixel (0,1) is calculated from the color information of the adjacent-pixel group N2. The color information on the pseudo color of the pixel (1,1) is calculated from the color information of the adjacent-pixel group N3. The color information on the pseudo color of each pixel (0,0), (1,0), . . . , (m,n) thus calculated is stored in the addresses corresponding to each pixel, as shown in FIG. 6.

Figure 7:
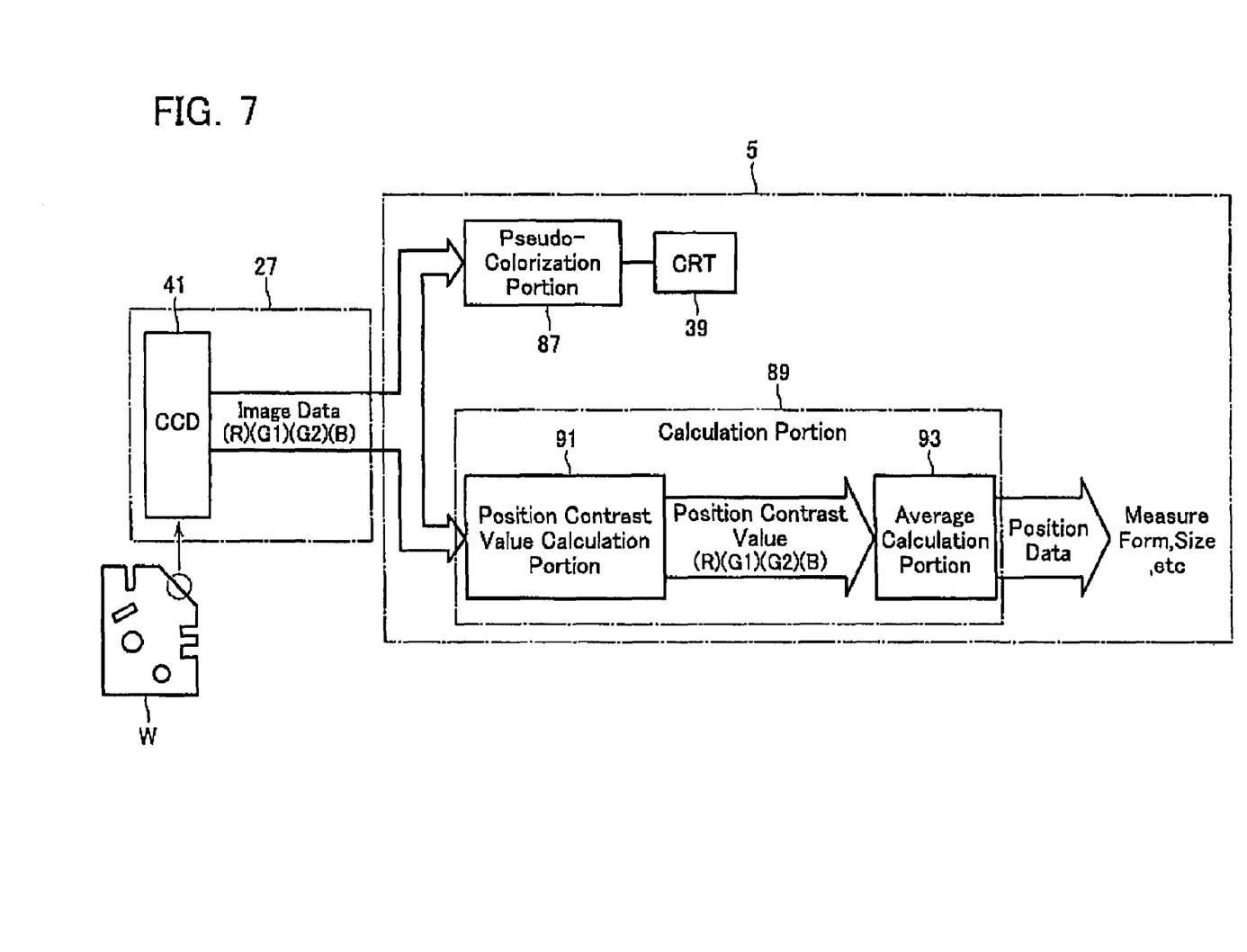
FIG. 7 is a function block diagram for illustrating the operation of the image measuring apparatus according to this embodiment.

A description is now given of how the image measuring apparatus 1 according to this embodiment obtains the position data of the measuring object, using the detection of the edges of the work W as an example. For the edge detection, the measuring object is the edge, and the position data of the measuring object is the position data of the edge. FIG. 7 is a function block diagram of the image measuring apparatus 1 according to this embodiment for illustrating the measurement operation.

Figure 8:
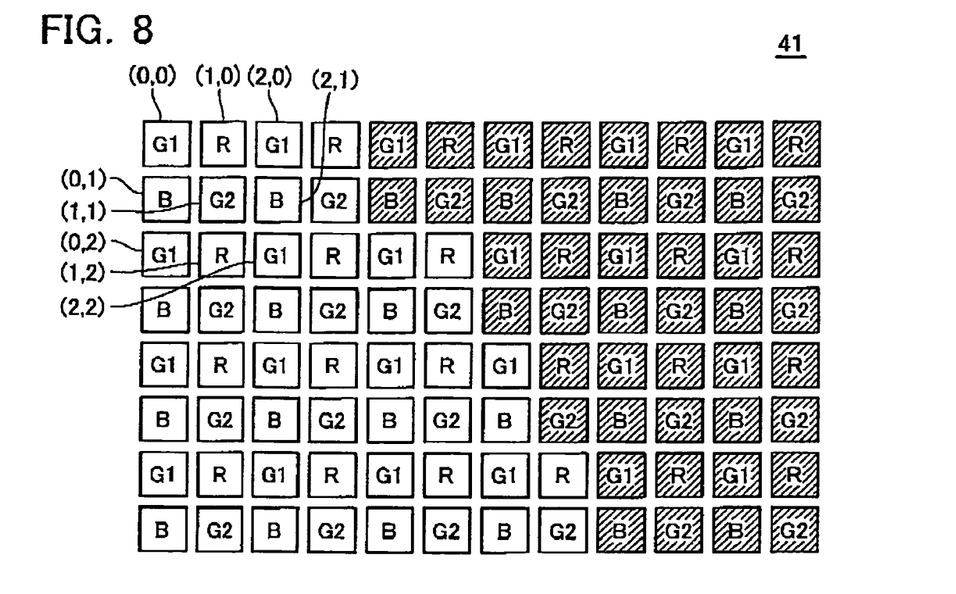
FIG. 8 is a plan view of the CCDs receiving light in the single-chip color camera.
Figure 9:
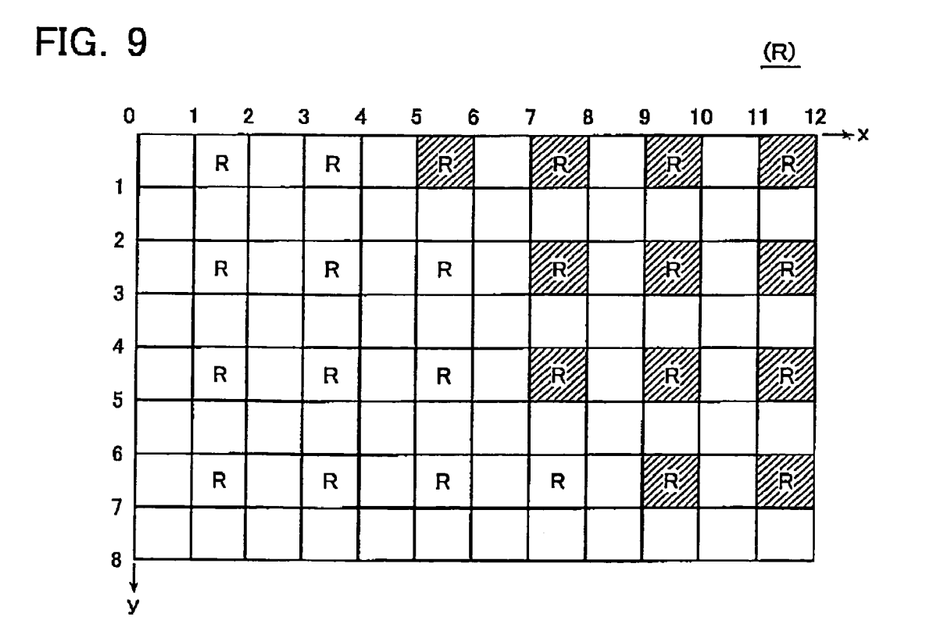
FIG. 9 shows the image data (R) obtained from the pixels under the filter R.
Figure 10:
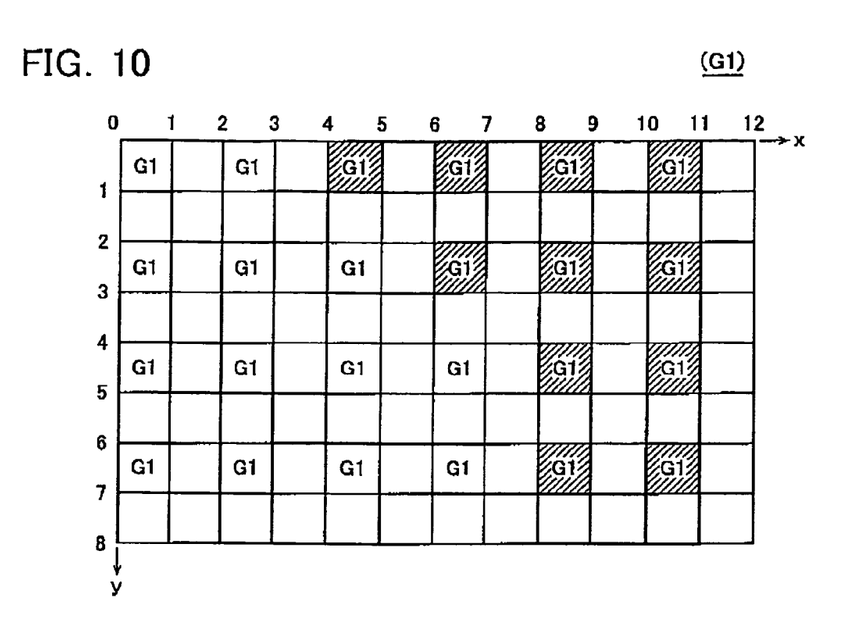
FIG. 10 shows the image data (G1) obtained from the pixels under the filter G1.
Figure 11:
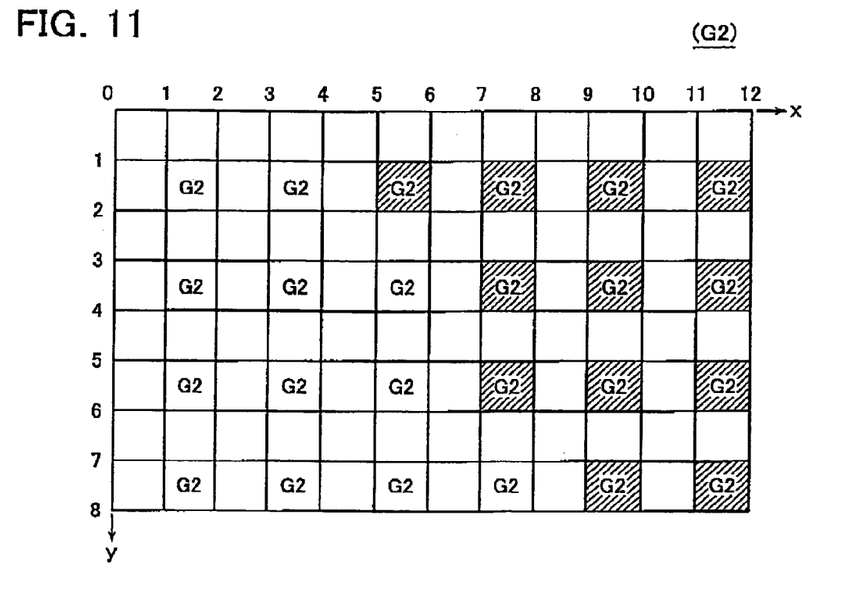
FIG. 11 shows the image data (G2) obtained from the pixels under the filter G2.
Figure 12:
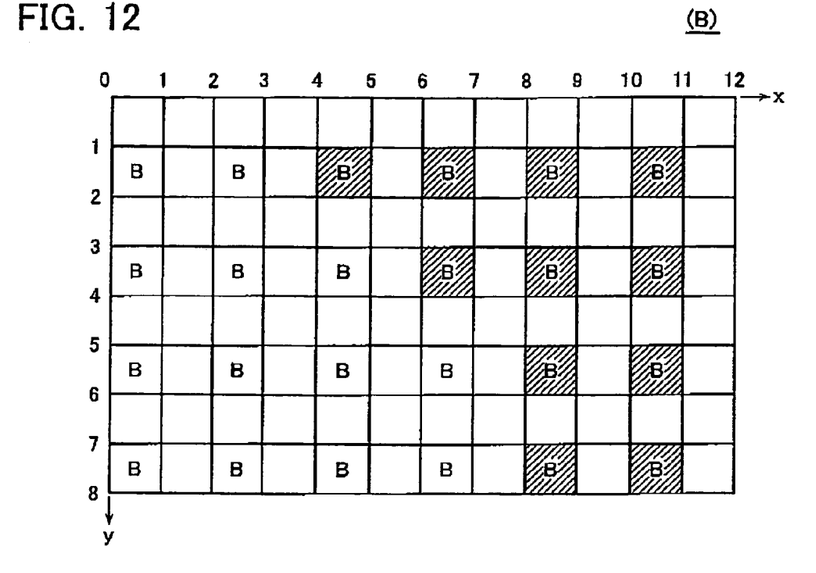
FIG. 12 shows the image data (B) obtained from the pixels under the filter B.
Figure 13:
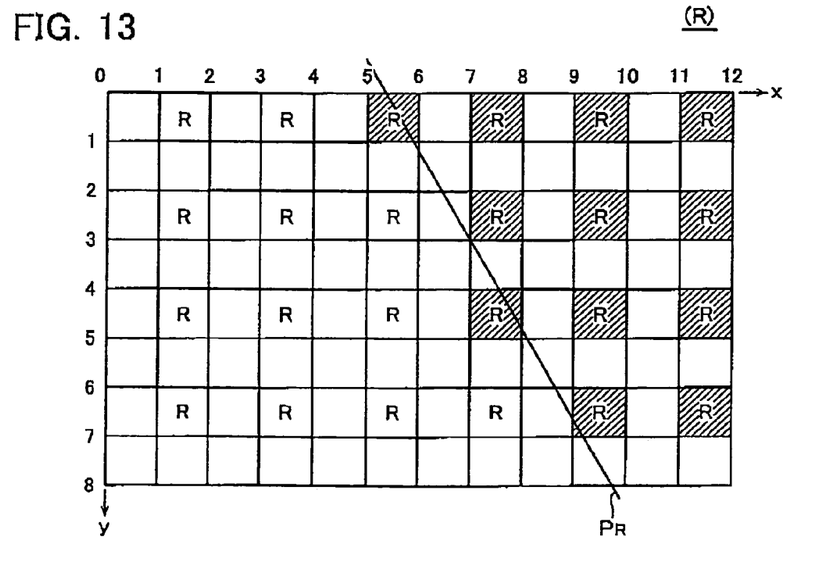
FIG. 13 shows the edge position $P_R$ detected based on the image data (R).

An image including a portion (shown by the dotted line) of the work W edge is projected onto the CCD 41 in the single-chip color camera 27. FIG. 8 is a plan view of the CCD 41 in this state. FIG. 8 corresponds to FIG. 5. The shaded pixels represent the dark portion, and the unshaded pixels represent the light portion. After the CCD 41 images a portion of the work W edge, the pixels under the filters R, G1, G2, and B provide the image data (R), (G1), (G2), and (B), respectively. FIGS. 9 to 12 show these four image data. After output from the CCD 41, these four image data go to the personal computer 5 without being pseudo-colorized in the single-chip color camera 27.

An image process application of the personal computer 5 such as a frame grabber incorporates the image data (R), (G1), (G2), and (B). The application then sends the image data to a pseudo-colorization portion 87 and a calculation portion 89 in the personal computer 5. The calculation portion 89 outputs the position data. The CPU 61 and multi-value image memory 67 and the like in FIG. 4 implement the above portion's functions.

A position/contrast-value calculation portion 91 in the calculation portion 89 calculates, for each of the image data (R), (G1), (G2), and (B), the edge position and the contrast value at one side and the other side across the edge as a boundary.

FIGS. 13 to 16 show the edge position $P_R$, $P_{G1}$, $P_{G2}$, and $P_B$ detected based on the image data (R), (G1), (G2), and (B), respectively.

Figure 14:
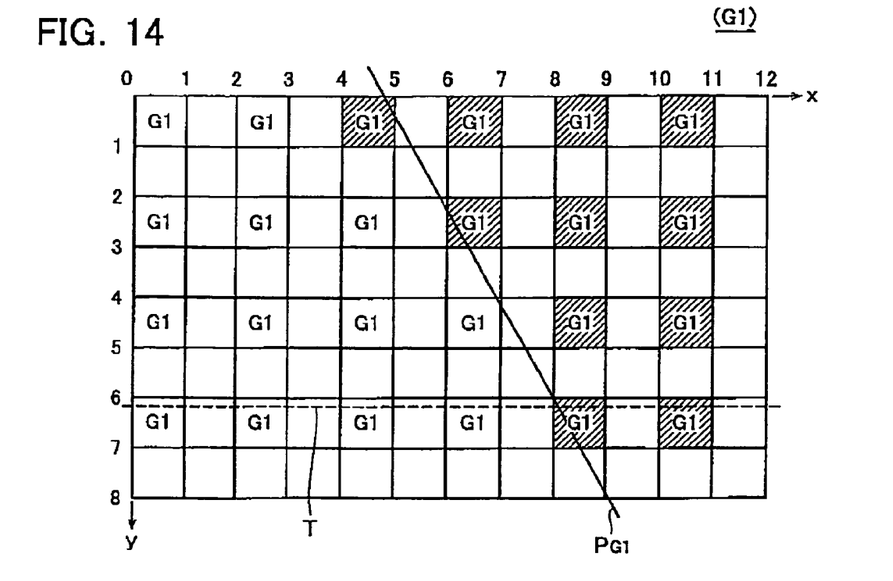
FIG. 14 shows the edge position $P_{G1}$ detected based on the image data (G1).
Figure 15:
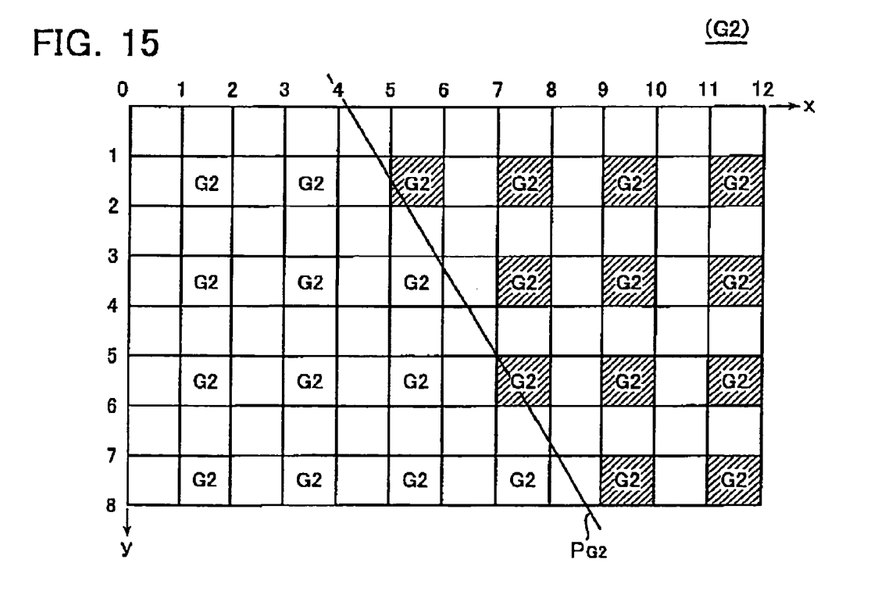
FIG. 15 shows the edge position $P_{G2}$ detected based on the image data (G2).
Figure 16:
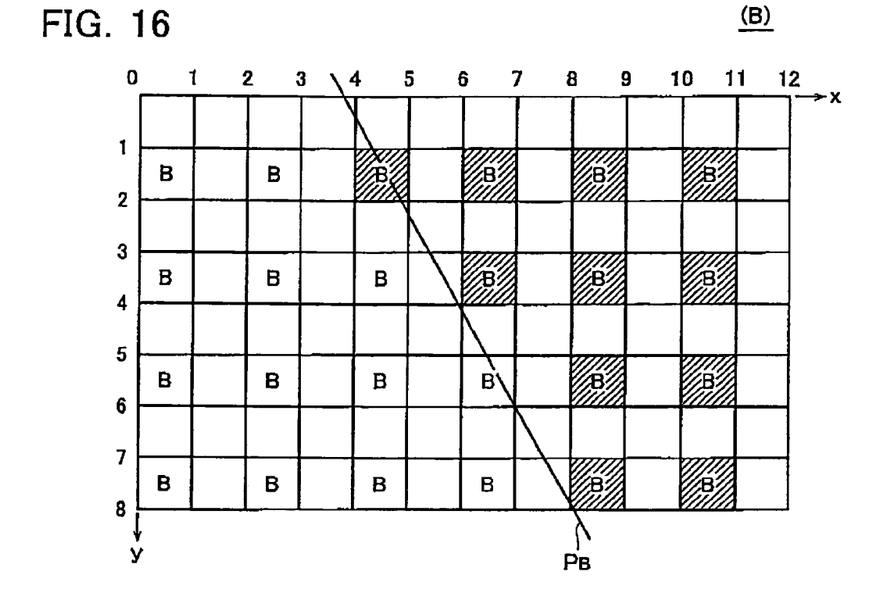
FIG. 16 shows the edge position $P_B$ detected based on the image data (B).
Figure 17A:
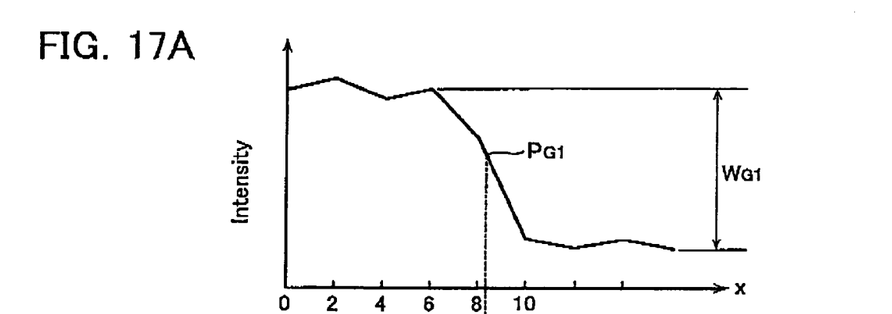
FIG. 17A is an image color-density graph based on the image data (G1).
Figure 17B:
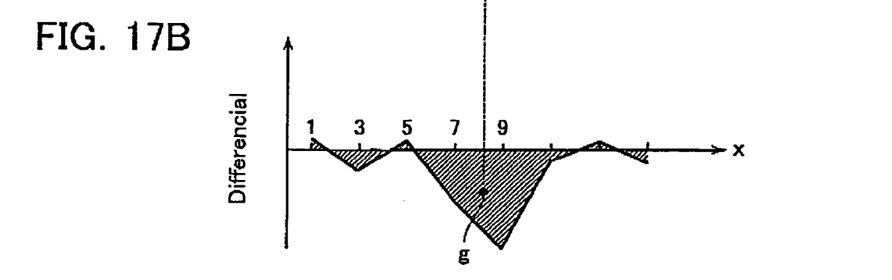
FIG. 17B is a differential graph obtained by differentiating the color-density graph in FIG. 17A.

An example of how the edge position and contrast value are determined is described for the image data (G1) shown in FIG. 14. An edge-detection tool T on the image moves along the y-axis. In FIG. 14, the edge-detection tool T is positioned between y=6 and y=7. FIG. 17A shows the image color-density graph based on the image data (G1). In FIG. 17A, the horizontal axis indicates the x direction of the image data. The vertical axis indicates the color density. FIG. 17B is a differential graph obtained by differentiating the color-density graph in FIG. 17A. The barycenter g of the area defined by the differential graph (which may be a graph of the squared differential value) and the x-axis shown in FIG. 17B is the edge position $P_{G1}$. In this way, the calculation of the edge position can determine the edge position at the subpixel level. FIG. 14 shows the edge position line obtained by joining the edge positions $P_{G1}$. FIG. 17A also shows the contrast value $W_{G1}$ between one side and the other side across the edge as a boundary.

The edge position and contrast value are determined for each of the four image data, providing four sets of the edge position and contrast value. These four sets of the edge position and contrast value (R), (G1), (G2), and (B) are sent to the average calculation portion 93 in the calculation portion 89. The average calculation portion 93 calculates the average edge position P using the equations below. The average calculation portion 93 then outputs the average edge position P as the edge position data.

$$P=(P_R W_R + P_{G1} W_{G1} + P_{G2} W_{G2} + P_B W_B)/(W_R + W_{G1} + W_{G2} + W_B)$$

where,
P: the average edge position,
$P_R$: the edge position based on the image data (R),
$P_{G1}$: the edge position based on the image data (G1),
$P_{G2}$: the edge position based on the image data (G2),
$P_B$: the edge position based on the image data (B),
$W_R$: the contrast value based on the image data (R),
$W_{G1}$: the contrast value based on the image data (G1),
$W_{G2}$: the contrast value based on the image data (G2),
$W_B$: the contrast value based on the image data (B).

Figure 18:
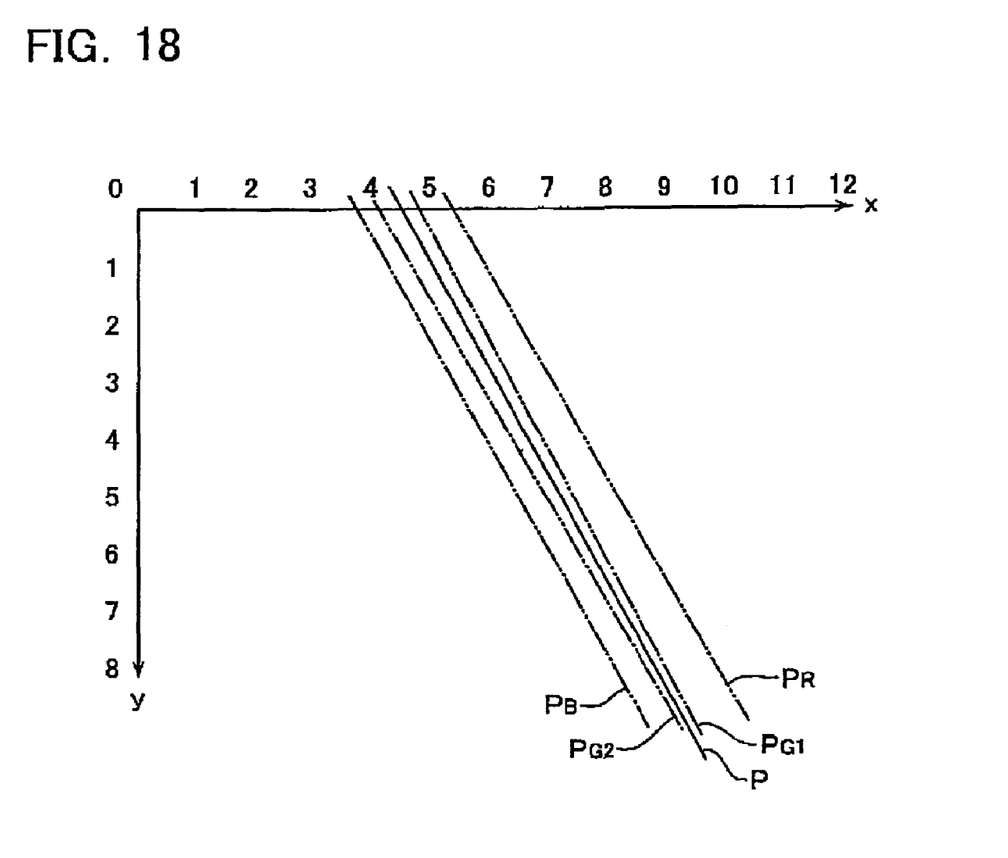
FIG. 18 shows the edge positions $P_R$, $P_{G1}$, $P_{G2}$, and $P_B$ respectively based on the image data (R), (G1), (G2), and (B), and the position P obtained by averaging those four edge positions.

FIG. 18 shows the graph showing the edge position P, and the edge positions $P_R$, $P_{G1}$, $P_{G2}$, and $P_B$ based on the image data (R), (G1), (G2), and (B), respectively. The edge position data P thus obtained provides the measurements of the shape, dimension, and the like of the work W. After receiving the image data (R), (G1), (G2), and (B), the pseudo-colorization portion 87 pseudo-colorizes the image data. The CRT 39 then displays the pseudo-colorized image data.

Figure 19:
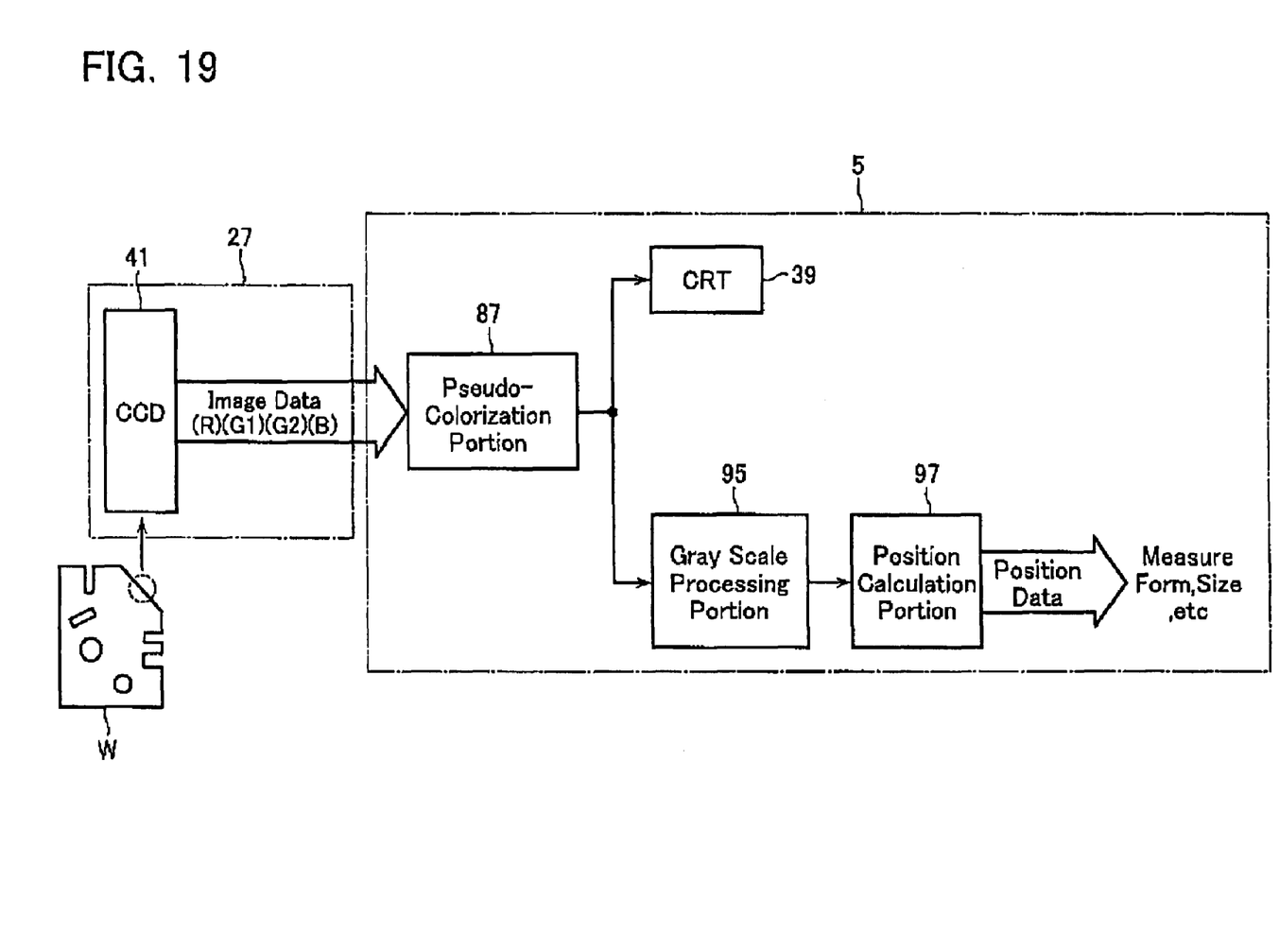
FIG. 19 is a function block diagram of the image measuring apparatus according to the comparative embodiment.

A description is now given of how the image measuring apparatus according to the comparative embodiment operates, and of the main effects of this embodiment in comparison with the comparative embodiment. FIG. 19 is a function block diagram of the image measuring apparatus according to the comparative embodiment. FIG. 19 corresponds to FIG. 7. The CCD 41 sends the image data (R), (G1), (G2), and (B) to the pseudo-colorization portion 87 in the personal computer 5, where the image data is pseudo-colorized.

Figure 20:
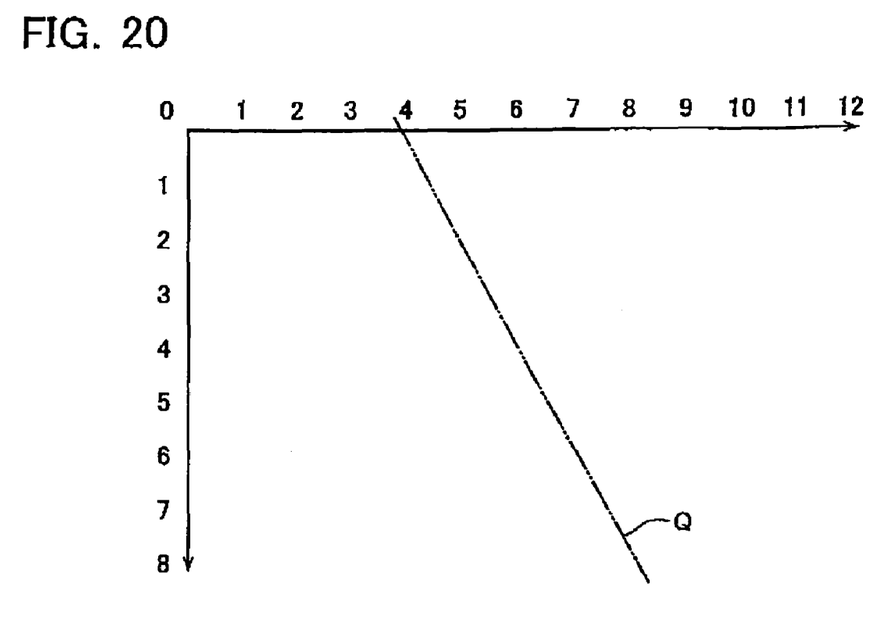
FIG. 20 shows the edge position Q measured by the image measuring apparatus according to the comparative embodiment.

The pseudo-colorization portion 87 sends the pseudo-colorized data to the CRT 39 for display. The pseudo-colorization portion 87 also sends the pseudo-colorized data to the gray-scale processing portion 95, where the image data is converted into the black, white, and gray data. The edge exists at the location where the image changes from light to dark (or from dark to light), that is, where the gray color exists. The position calculation portion 97 determines the location where the lightness of the gray color corresponds to a predetermined threshold value to specify the edge position Q as shown in FIG. 20.

Figure 21:
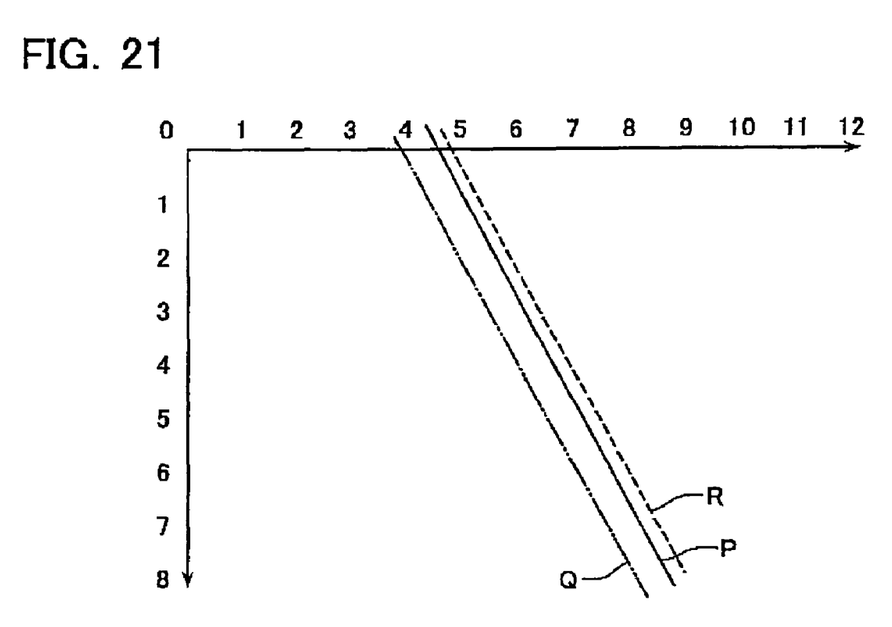
FIG. 21 shows the actual edge position R, edge position P measured in this embodiment, and edge position Q measured in the comparative embodiment.

FIG. 21 shows the actual edge position R, the edge position P measured according to this embodiment, and the edge position Q measured according to the comparative embodiment. This embodiment can provide more accurate edge position than the comparative embodiment. The reason is as follows.

The comparative embodiment calculates the edge position based on the image data after pseudo-colorization, and uses that edge position as the edge position data. As described above in BACKGROUND OF THE INVENTION, the single-chip color camera expresses colors using the color information from the adjacent pixels. At the edges where the brightness extremely differs between the adjacent pixels, therefore, the abnormal color-density cause blur of the like in the edge image. The comparative embodiment uses such blurred images as a basis to calculate the edge position, providing larger measurement errors.

In contrast, this embodiment calculates the edge position and contrast value for each of the four image data before pseudo-colorization. This calculation is thus unaffected by the abnormal color-density change due to the extreme brightness difference among the adjacent pixels. This embodiment weights the four edge positions with the four contrast values based on each image data to calculate the average edge position.

The average edge position is calculated by weighting the edge positions with the contrast values for the following reason. Distinguishing between noise and the edge position based on the image data with a smaller contrast value is more difficult, while distinguishing between noise and the edge position based on the image data with a larger contrast value is less difficult. It is thus preferable to weight more heavily the edge position based on the image data with a larger contrast value to calculate the average edge position.

This embodiment then outputs the above average edge position as the edge position data, which allows the specification of the edge position at the subpixel level. As described above, this embodiment allows high accuracy measurements using the single-chip color camera 27 as the imaging portion. Particularly, a single-chip color camera with megapixels can provide an image with a higher resolution, further improving the edge detection accuracy.

According to this embodiment, the single-chip color camera 27 can provide following advantages over the three-chip color camera. (1) A lower-cost image measuring apparatus 1, (2) a smaller camera 27, which improves the positioning accuracy of the camera unit 23.

According to this embodiment, the single-chip color camera 27 obtains the four image data (R), (G1), (G2), and (B), and outputs the data without internally pseudo-colorizing them, which data are then pseudo-colorized by the personal computer 5. The personal computer 5 also calculates the edge position data. It is thus possible to use the existing single-chip color camera in which the camera 27 does not internally pseudo-colorize the image data.

Note that the color filters provided on the four pixels may be a combination of C (cyan), M (magenta), Y1 (yellow), and Y2 (yellow), or a combination of R (red), G (green), B (blue), and C (cyan). Particularly, the RGBC filters will allocate different colors to the four pixels, providing the following effect. For R, G1, G2, and B filters, the image data from the green (i.e., G1, G2) occupies 50%. A larger error in the edge position based on the green image data will thus provide a particularly larger error in the average edge position.

In contrast, the RGBC filters can provide the image data from the four colors. A large error in the edge position based on a one-color image data can still provide a small error in the average edge position because the edge positions based on the remaining three-color image data are also used in the average calculation.

Note that although this embodiment takes the edge detection as an example, the present invention applies to the pattern matching which detects positions matched to the template on the image. This is because the present invention applies to the acquisition of the pattern position data which the pattern matching needs. More specifically, the pattern positions and contrast values are calculated based on the image data (R), (G1), (G2), and (B). The pattern positions are then weighted with the contrast values to calculate the average pattern position. The present invention can improve the measurement accuracy by taking the above average as the pattern position, rather than using the pseudo-colorized image data which may blur the pattern edge and cause a mismatching at the subpixel level.

What is claimed is:

1. An image measuring apparatus comprising:
   an imaging portion with pixels, each pixel being allocated with one color, four pixels constituting one set, one set being allocated with a plurality of colors to express a color, and said sets being arranged in a matrix, configured to image a measuring object and output four image data based on said four pixels, respectively; and
   a calculation portion which calculates, based on the four image data, respectively, positions of the measuring object and contrast values at one side and an other side across the measuring object as a boundary, and which generates a position data of the measuring object based on the positions and contrast values, and outputs the position data,
   wherein the position data of the measuring object is generated by calculating an average position of the measuring object by:
   multiplying the positions by the corresponding contrast values;
   calculating the sum of the products of the positions and the contrast values; and
   dividing the sum of the products by the sum of the contrast values.

2. The image measuring apparatus according to claim 1, further comprising:
   a single-chip color camera comprising the imaging portion; and
   a personal computer comprising a pseudo-colorization portion which performs pseudo-colorization with the four image data from the imaging portion, and the calculation portion.

3. The image measuring apparatus according to claim 1, wherein different colors are allocated to the four pixels.

4. The image measuring apparatus according to claim 1, wherein G component is allocated to two of the four pixels, and R component and B component are respectively allocated to the other two pixels.

5. The image measuring apparatus according to claim 1, wherein Y component is allocated to two of the four pixels, and C component and M component are respectively allocated to the other two pixels.

6. The image measuring apparatus according to claim 1, wherein R component, G component, B component, and C component are respectively allocated to the four pixels.

7. An image measuring method comprising the steps of:
   imaging a measuring object using an imaging portion with pixels, each pixel being allocated with one color, four pixels constituting one set, one set being allocated with a plurality of colors to express a color, and said sets being arranged in a matrix, to output four image data based on said four pixels, respectively;
   calculating, based on the four image data, respectively, positions of the measuring object and contrast values at one side and an other side across the measuring object as a boundary; and
   generating a position data of the measuring object based on the positions and contrast values, and outputting the position data,
   wherein the position data of the measuring object is generated by calculating an average position of the measuring object by:
   multiplying the positions by the corresponding contrast values, respectively;
   calculating the sum of the products of the positions and the contrast values; and
   dividing the sum of the products by the sum of the contrast values.

8. The image measuring method according to claim 7, wherein different colors are allocated to the four pixels.

9. The image measuring method according to claim 7, wherein G component is allocated to two of the four pixels, and R component and B component are respectively allocated to the other two pixels.

10. The image measuring method according to claim 7, wherein Y component is allocated to two of the four pixels, and C component and M component are respectively allocated to the other two pixels.

11. The image measuring method according to claim 7, wherein R component, G component, B component, and C component are respectively allocated to the four pixels.

* * * * *